July 13, 1937.  M. ZAIGER  2,087,178
WINDSHIELD WIPER
Filed June 24, 1936   2 Sheets-Sheet 1
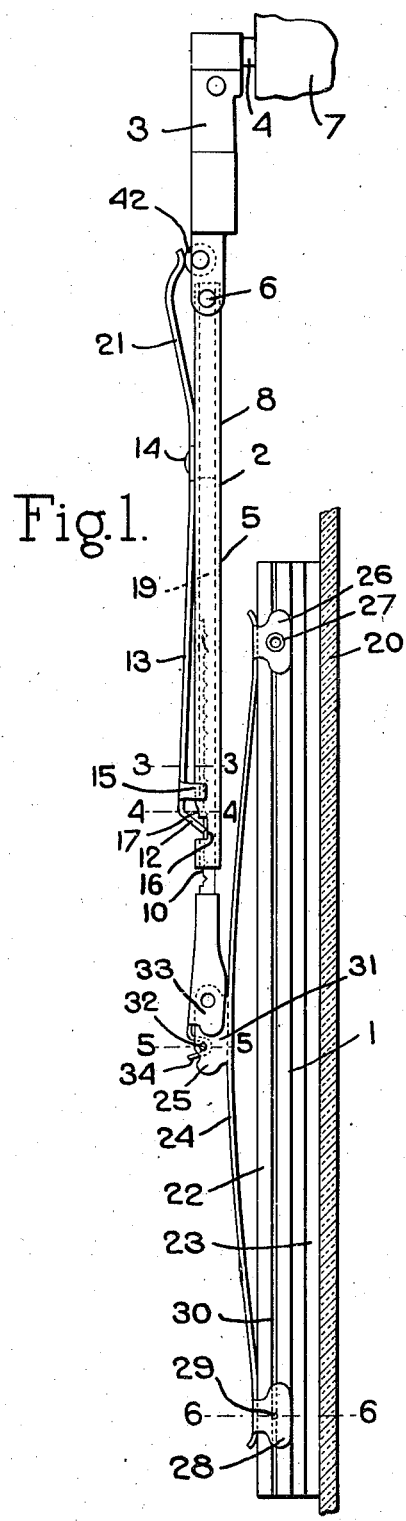
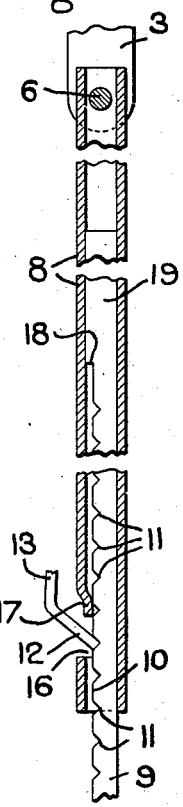
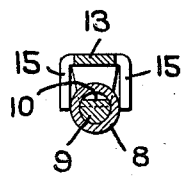
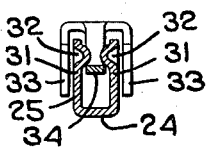
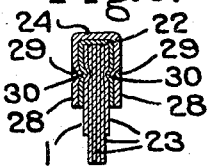
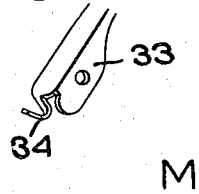
Inventor.
Max Zaiger
by Heard Smith & Tennant.
Attys.

July 13, 1937.   M. ZAIGER   2,087,178
WINDSHIELD WIPER
Filed June 24, 1936   2 Sheets-Sheet 2
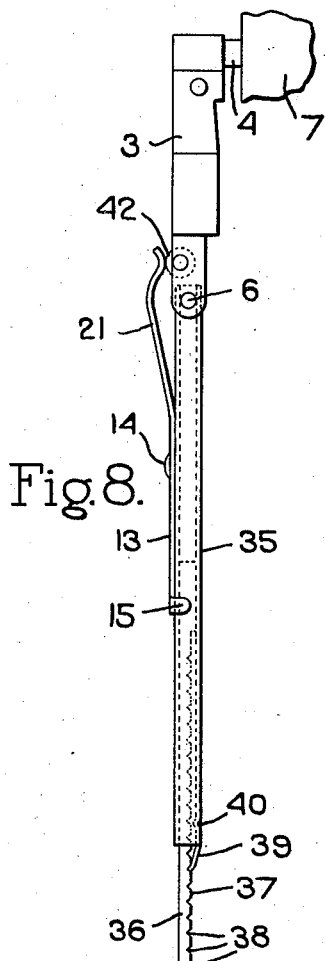
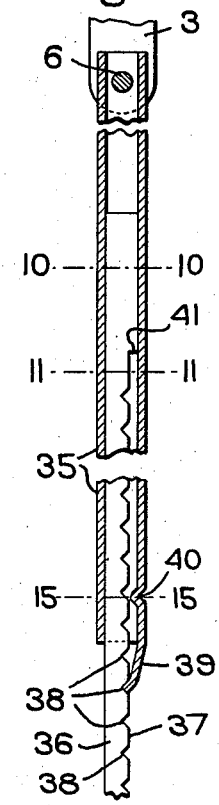
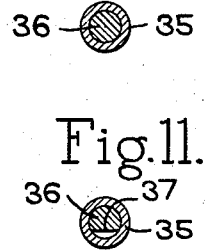
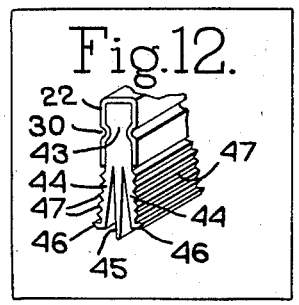
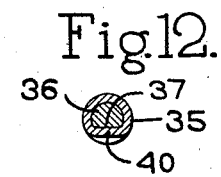
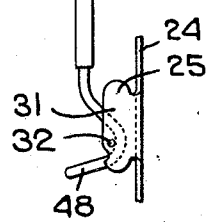
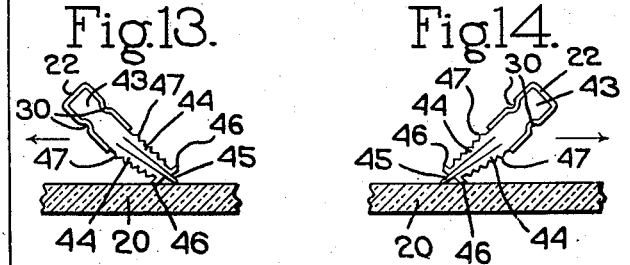
Inventor.
Max Zaiger
by Heard Smith & Tennant.
Attys.

Patented July 13, 1937

2,087,178

UNITED STATES PATENT OFFICE 2,087,178

WINDSHIELD WIPER

Max Zaiger, Lynn, Mass.

Application June 24, 1936, Serial No. 86,962

2 Claims. (Cl. 287—58)

This invention relates to windshield wipers and it has for its objects to provide a windshield wiper with an improved extensible wiper arm.

In order to give an understanding of the invention I have illustrated in the drawings some selected embodiments thereof which will now be described, after which the novel features will be pointed out in the appended claims.

In the drawings:

Fig. 1 is a side view of a windshield wiper showing one embodiment of my invention;

Fig. 2 is a fragmentary longitudinal section through the wiper arm;

Fig. 3 is an enlarged section on the line 3—3, Fig. 1;

Fig. 4 is an enlarged section on the line 4—4, Fig. 1;

Fig. 5 is an enlarged section on the line 5—5, Fig. 1;

Fig. 6 is an enlarged section on the line 6—6, Fig. 1;

Fig. 7 is a perspective view of the end of the wiper arm;

Fig. 8 is a view similar to Fig. 1 but showing a different embodiment of the invention;

Fig. 9 is a fragmentary longitudinal section of Fig. 8.

Fig. 10 is a section on the line 10—10, Fig. 9;

Fig. 11 is a section on the line 11—11, Fig. 9;

Fig. 12 is a section on the line 15—15, Fig. 9.

Referring first to Fig. 1, 1 indicates generally the wiper blade and 2 is the wiper arm to which the blade is detachably secured. The wiper arm 2 is of the extensible type so that it can be lengthened or shortened to place the wiper element in different vertical positions. The wiper arm 2 comprises the upper section 3 which is fast to the oscillating rock shaft 4, and the lower section 5 which is an extensible section and which is pivotally connected to the upper section 3, as shown at 6. The rock shaft is journalled in and projects from the front 7 of the automobile and is actuated by any suitable or usual actuating mechanism.

The extensible section 5 of the wiper arm comprises a tubular member 8, the upper end of which is mounted on the pivot pin 6, and the rod member 9 which telescopes within the tubular member 8 and to the end of which the wiper blade is detachably secured. The rod member 9 is flattened on one side, as shown at 10, and the flat side is provided with a plurality of notches 11 adapted to engage a yielding retaining pawl or dog 12 by which the rod member 9 is held in its adjusted position. In the construction shown in Fig. 1 the retaining dog 12 is formed on the end of a resilient arm 13 which is secured to the tubular member 8 at 14. Said resilient arm 13 is formed with two ears or wings 15 which embrace the tubular member 8 and thus retain the arm 13 in its proper position. The resiliency of the arm 13 holds the dog 12 yieldingly against the flat face 10 of the rod member 9, and said member 9 is withdrawn from the tubular member to extend the wiper arm or is retracted within the tubular member to shorten the length of the wiper arm. The engagement of the dog 12 in a notch 10 serves to hold the extensible member 9 in its adjusted position.

The tubular member 8 is shown as having an opening 16 in which the dog or pawl 12 operates and said tubular member is flattened at the rear edge of the opening into contact with the flat side 10 of the rod 9, as shown at 17. This flattened portion 17 of the tubular member 8 accomplishes two purposes. In the first place, it cooperates with the flat surface 10 of the rod 9 to prevent the rod from turning about its axis, and in the second place it cooperates with the shoulder 18 with which the rod 9 is provided to prevent the rod 9 from being withdrawn from the tubular member. The flattened surface 10 does not extend to the rear end of the rod 9 but terminates at the shoulder 18, the portion 19 of the rod beyond the shoulder being circular and fitting the interior of the tubular member 8.

The wiper arm is further provided with means for yieldingly holding the wiper blade against the glass 20, and for this purpose the wiper arm is formed with a spring member 21 which bears at its end against a roll 42 carried by the section 3 of the wiper arm. This spring not only serves to yieldingly hold the wiper blade against the glass 20, but it permits the section 5 of the wiper arm to be swung away from the windshield when it is necessary to do so for replacing the wiper blade or cleaning the windshield.

The wiper blade 1 comprises a wiping element of rubber which is retained in the usual holder or backing member 22, the latter being of metal and having a U shape in cross section to embrace the back edge of the wiping element. The construction shown in Fig. 6 is the well-known construction wherein the wiper blade is composed of a plurality of thin layers or plies 23 of flexible rubber. The wiper blade is provided with a resilient yoke member 24 which is provided with a clip portion 25 by which the blade is secured to the end of the wiper arm.

The yoke member 24 is formed of a strip of resilient spring metal which extends lengthwise of the wiper blade and which is fastened thereto at its ends. One end of the yoke member 24 is formed with two ears 26 which embrace the holder 22 of the wiper blade, and the other end of the yoke is provided with two similar ears 28 which also embrace the holder 22 of the wiper blade. These pairs of ears 26 and 28 may be secured to the holder 22 in any suitable way. As shown in Fig. 6, the ears 26 are secured to the holder 22 by means of a rivet 27, while each ear 28 is provided with outwardly-directed projections 29 that are received in a groove 30 formed in the exterior face of each side of the holder 22. These grooves 30 may be formed by indenting the sides of the holder, thereby serving to secure the wiper element within the holder. The ears 28 are preferably sufficiently resilient so that they can be forced over the back of the holder, and when in place the inwardly-directed projections 28 will snap into the groove 30.

If desired, the ears 26 may be provided with the inwardly-directed projections 29 for securing said ears to the holder instead of the rivet 27.

By reason of the resilient yoke which extends a considerable distance lengthwise of the wiper blade, the pressure of the wiper arm against the wiper blade due to the action of the spring 21 is transmitted to the wiper blade near the ends thereof instead of at the central portion and a better wiping action results.

The clip 25 by which the yoke 24 is secured to the wiper arm comprises two upstanding sides or cheek pieces 31, each of which is indented at 32 to form an inwardly-directed projection, said projections being opposite each other. This clip is adapted to be attached to wiper arms of various constructions. The wiper arm shown in Fig. 1, for instance, is formed at its end with two side flanges 33 adapted to receive the clip 25 between them. This wiper arm is also formed at its end with a U-shaped extension 34 which is adapted to be entered between the cheek pieces 31 and to hook under and around the inwardly-directed projections 32. Preferably, the clip 25 will be somewhat narrower than the space between the flanges 33 so as to allow the wiper blade to flop slightly at the end of its stroke in each direction. The cooperation of the U-shaped extension 34 with the clip serves to hold the yoke member 24, and thus the wiper blade, to the wiper arm while allowing the wiper blade to have any necessary flopping movement.

In Fig. 8 I have shown a wiper arm embodying my invention having a slightly different construction from that shown in Fig. 1. In this wiper arm the extensible section comprises a tubular member 35 similar to the member 8 in Fig. 1 and an extensible rod member 36 somewhat similar to the rod member 9 of Fig. 1. In the embodiment shown in Fig. 8, however, the rod member 36 is provided with the flattened face 37 on its inner side instead of on the outside, and the notches 38 with which said flattened face is provided cooperate with a resilient pawl or dog 39 extending from the end of the tubular member 35. Said tubular member 35 is indented near its end, as shown at 40, to provide a flat face to cooperate with the flat face 37 of the rod 36, thereby to prevent the rod from turning. This indentation 40 also cooperates with the shoulder 41 on the rod 36 to prevent the latter from being withdrawn from the tubular member 35.

The wiper arm shown in Fig. 8 is formed at its end with a goose-necked portion 48 which is adapted to be received between the ears 31 of the clip 25 and to hook under the inwardly-directed projections 32. This serves to hold flexibly the wiper blade to the clip and yet to allow the wiper blade to have any necessary flopping action.

I claim:

1. A windshield wiper arm for supporting a wiper blade, said arm comprising a tubular member, a wiper-carrying rod member telescoping within the tubular member and having a flat face provided with notches, said tubular member enclosing the portion of the rod member which telescopes therein and having a portion cooperating with said flat face to prevent the rod member from turning, and a resilient finger engaging said notches and holding the rod member in its adjusted position.

2. A windshield wiper arm for supporting a wiper blade, said arm comprising a tubular member, a wiper carrying rod member telescoping within the tubular member and having a flat face provided with notches and an outwardly facing shoulder at one end of said face, said tubular member enclosing the portion of the rod member which telescopes therein and having an indented portion to engage the flat face and serving to prevent the rod member from turning within the tubular member and cooperating with said shoulder to limit the extending movement of the rod member, and a resilient finger engaging said notches and holding the rod member in its adjusted position.

MAX ZAIGER.